(12) United States Patent
Stanton et al.

(10) Patent No.: US 7,593,830 B2
(45) Date of Patent: Sep. 22, 2009

(54) CONTROLLED MATERIAL PROCESSING METHOD

(75) Inventors: Jennifer L. Stanton, Clifton Park, NY (US); Roger Knox, Clifton Park, NY (US); Harry A. Bayly, Mechanicville, NY (US)

(73) Assignee: Momentive Performance Materials, Albany, NY (US)

( * ) Notice: Subject to any disclaimer, the term of this patent is extended or adjusted under 35 U.S.C. 154(b) by 6 days.

(21) Appl. No.: 11/923,789

(22) Filed: Oct. 25, 2007

(65) Prior Publication Data

US 2008/0109112 A1    May 8, 2008

Related U.S. Application Data (62) Division of application No. 11/557,671, filed on Nov. 8, 2006.

(51) Int. Cl.
  G05B 15/00   (2006.01)
  G06F 19/00   (2006.01)
  G06F 17/40   (2006.01)
(52) U.S. Cl. ............... 702/173; 141/13; 141/21; 141/153; 141/192; 177/12; 177/15; 177/21; 177/24; 177/120; 177/121; 221/1; 22/1; 22/14; 22/55; 22/59; 22/77; 700/305

(58) Field of Classification Search ............ 141/21, 141/13, 18, 83, 100, 102, 103, 104, 105, 141/129, 153, 182, 192; 702/127, 129, 173, 702/1, 128, 187, 188; 177/2, 7, 8, 9, 13, 177/60, 105, 12, 15, 16, 17, 21, 24, 25.11, 177/25.12, 25.13, 25.18, 116, 119, 120, 121; 209/552, 592; 700/240, 305, 1, 75, 77, 90, 700/95, 96, 213, 214, 231, 241; 73/198, 73/861, 861.04, 865; 221/1, 9, 92; 222/1, 222/14, 52, 55, 57, 59, 77, 80
See application file for complete search history.

(56) References Cited

U.S. PATENT DOCUMENTS 2,889,077 A * 6/1959 Cunningham ............... 222/77

(Continued)

FOREIGN PATENT DOCUMENTS

EP    0 884 626 A2 * 12/1998

*Primary Examiner*—Edward R Cosimano
(74) *Attorney, Agent, or Firm*—Philip D. Freedman PC; Philip D. Freedman; Kenneth S. Wheelock (57) ABSTRACT

A viscous material processing system comprises a feed system controller having a set of instructions to store an input set point weight or amount; sense a progressing weight or amount of material fed by the feed system; compare the progressing weight with the set point weight or amount and terminate feed from the system when the compared progressing weight is substantially equal to the set point weight or amount; and a viscous material compounding system connected to the feed system to receive material fed by the feed system.

17 Claims, 6 Drawing Sheets

U.S. PATENT DOCUMENTS

| | | | | |
|---|---|---|---|---|
| 3,035,648 | A * | 5/1962 | Williams, Jr. | 177/70 |
| 3,164,217 | A * | 1/1965 | Peirce et al. | 177/1 |
| 3,474,874 | A * | 10/1969 | Pettis, Jr. | 177/50 |
| 3,508,591 | A * | 4/1970 | Johnson et al. | 83/13 |
| 3,706,587 | A * | 12/1972 | Henry | 177/1 |
| 3,820,428 | A * | 6/1974 | Marshall et al. | 83/38 |
| 3,821,913 | A * | 7/1974 | Bajcar et al. | 83/92 |
| 3,823,821 | A * | 7/1974 | Wallace | 209/593 |
| 3,824,885 | A * | 7/1974 | Marshall et al. | 83/19 |
| 3,918,539 | A * | 11/1975 | Wise | 177/210 R |
| 4,067,483 | A | 1/1978 | Mucke | |
| 4,071,168 | A | 1/1978 | Stone | |
| 4,154,044 | A | 5/1979 | Lang | |
| 4,221,102 | A | 9/1980 | Lang | |
| 4,284,597 | A | 8/1981 | Stein | |
| 4,402,428 | A | 9/1983 | Lang | |
| 4,448,272 | A * | 5/1984 | Keller et al. | 177/1 |
| 4,448,736 | A * | 5/1984 | Emery et al. | 264/40.1 |
| 4,693,397 | A | 9/1987 | Lang | |
| 4,874,022 | A | 10/1989 | Schwerdtel | |
| 4,986,717 | A | 1/1991 | Cummins | |
| 5,078,304 | A | 1/1992 | Schneider | |
| 5,137,368 | A | 8/1992 | Kistner | |
| 5,240,324 | A * | 8/1993 | Phillips et al. | 366/141 |
| 5,335,185 | A * | 8/1994 | Pitts et al. | 700/282 |
| 5,340,211 | A * | 8/1994 | Pratt | 366/141 |
| 5,360,146 | A | 11/1994 | Ikushima | |
| 5,377,815 | A | 1/1995 | Vetter | |
| 5,417,169 | A | 5/1995 | Carpenter | |
| 5,460,209 | A * | 10/1995 | Jandura et al. | 141/83 |
| 5,671,873 | A | 9/1997 | Hammerl | |
| 5,797,516 | A | 8/1998 | Brandl | |
| 6,060,667 | A * | 5/2000 | Pollock | 177/121 |
| 6,061,608 | A * | 5/2000 | Moldavsky | 700/240 |
| 6,211,267 | B1 | 4/2001 | Suto | |
| 6,391,234 | B1 | 5/2002 | Silvi | |
| 6,414,054 | B1 | 7/2002 | Boffard | |
| 6,444,154 | B1 | 9/2002 | Boudreau | |
| 6,474,971 | B1 | 11/2002 | Dong | |
| 6,499,001 | B1 | 12/2002 | Meyer | |
| 6,502,013 | B1 * | 12/2002 | Sosnik | 700/240 |
| 6,572,253 | B2 | 6/2003 | Silvi | |
| 6,604,559 | B2 | 8/2003 | Rubin | |
| 6,749,786 | B2 | 6/2004 | Boudreau | |
| 7,227,472 | B1 | 10/2006 | Enokida | |
| 2005/0241774 | A1 | 11/2005 | Hart | |
| 2008/0087150 | A1 * | 4/2008 | Stanton et al. | 83/78 |

\* cited by examiner

CONTROLLED MATERIAL PROCESSING METHOD

This application is a division of Stanton et al. Ser. No. 11/557,671, filed Nov. 8, 2006.

BACKGROUND OF THE INVENTION

The invention relates to a material processing control system and method, in particular for controlling a viscous material processing system.

In a viscous material processing system, feed is mixed and additives are injected in precise proportions to produce a customized product. The system requires exact and reliable dosing and feed operations to achieve uniform products with narrow tolerance properties. Accurately metering the material in a feed step can be critical to proper system operation.

However, it is difficult to accurately process a viscous material. The material only slowly responds to change in feed rate. The material may be resistant to pouring or if it can be poured, pour rate can be extremely slow. The material may exhibit high levels of adhesion or tendency to stick to other materials and/or cohesion or a tendency to remain stuck to itself and therefore resistant to separation. The material may be shear thickening, exhibiting increasing viscosity as shear on the material is increased. These properties present problems to process control.

Accurate quantities of the material are difficult to separate from a bulk of the material and are difficult to accurately process. Accordingly, there is a need to control processing of such material. Also, there is a need to accurately cut defined quantities of such material from a bulk quantity, regardless of the form of the bulk quantity and there is a need to accurately charge a viscous material to a processing system.

BRIEF DESCRIPTION OF THE INVENTION

The invention provides a system and method to control processing of viscous materials.

The invention can be described as a viscous material processing system, comprising: a feed system controller having a set of instructions to store an input set point weight or amount; sense a progressing weight or amount of material fed by the feed system; compare the progressing weight with the set point weight or amount and terminate feed from the system when the compared progressing weight is substantially equal to the set point weight or amount; and a viscous material compounding system connected to the feed system to receive material fed by the feed system.

In an embodiment, the invention is a data processing device, comprising: a reader to read a sensed weight or amount of material fed to a material compounding system; a comparator to compare the sensed weight or amount with a stored set point weight or amount; and a regulator to terminate feed of material to the material compounding system when the compared sensed weight or amount is substantially equal to the set point weight or amount.

In another embodiment, the invention is a computer implemented method, comprising: storing an input set point weight or amount, sensing a progressing weight or amount of viscous material fed by a feed system; comparing the progressing weight with the set point weight or amount; and terminating feed from the system when the compared progressing weight is substantially equal to the set point weight or amount.

In still another embodiment, the invention is a viscous material feed method, comprising: determining an initial weight of a combined feed system, container and viscous material held within the container; evacuating viscous material from the container by the feed system for charge to a viscous material compounding process; monitoring a weight of the combined feed system, container and viscous material held within the container as material is evacuated; determining a progressing weight or amount of material fed by the feed system according to a difference between the initial weight and the monitored weight of the combined feed system, container and viscous material held within the container as material is evacuated; and controlling a rate of cutting viscous material that is evacuated from the container for feed to the viscous material compounding process according to the determined amount of charged viscous material.

In still another embodiment, the invention is a computer implemented viscous material feed method, comprising: determining an initial weight of a combined feed system, container and viscous material held within the container; evacuating viscous material from the container by driving a platen through a longitudinal axis of the container to express viscous feed material from the container to a material compounding system; monitoring a weight of the combined feed system, container and viscous material held within the container as material is evacuated; determining a progressing weight or amount of material fed by the feed system according to a difference between the initial weight and the monitored weight of the combined feed system, container and viscous material held within the container as material is evacuated; and controlling a rate of cutting viscous material that is evacuated from the container for feed to the viscous material compounding process according to the determined amount of charged viscous material.

In still another embodiment, the invention is a computer implemented data processing system, comprising: reading a sensed weight or amount of material fed to a material compounding system; comparing the sensed weight or amount with a stored set point weight or amount; and terminating feed of material to the material compounding system when the compared sensed weight or amount is substantially equal to the set point weight or amount.

In another embodiment, the invention is a silicone gum feed system, comprising: a drum press located on a loss of weight scale; a feed tube that receives material expressed from a drum by the drum press; a cutting apparatus that meters material from the feed tube to a processing system according to loss of weight sensed by the scale; and a controller with a set of instructions to store an initial weight, monitor a continuing weight, determine weight of silicone gum fed to the processing system according to a difference between the initial weight and the monitored weight and controlling a rate of the cutting apparatus according to the difference.

In still another embodiment, the invention is a computer implemented data processing method, comprising: registering a material feed session set point weight or amount range defined by a first set point weight or amount and a second set point weight or amount; driving a material feed system to feed viscous material in the session by cutting a steadily moving material into increments that feed sequentially to a compounding system; monitoring a session total of material fed to the compounding system; comparing the session total of material to the session set point weight or amount range; increasing a cutting rate of material increments to decrease each cut increment quantity when total material is substantially equal to the first set point weight or amount of the session set point weight or amount range; and terminating the material feed of the session when the total material is substantially equal to a second limit of the set point weight or amount range.

And in another embodiment, the invention is a material feed system, comprising: a material extracting apparatus; and a controller with a set of instructions: to (i) refer to a look-up data base to determine a set point weight or amount for a material to be charged to a compounding system; (ii) sense an initial combined weight of a material extracting apparatus and a container with material; (iii) signal commencement of operation of the material extracting apparatus to evacuate material from the container; (iv) sense a progressing combined weight of the material extracting apparatus and the container with material; (v) calculate a charged material weight according to a difference between the initial combined weight and the sensed progressing combined weight; and (vi) terminating the material extracting apparatus operation when a calculated charged material weight is within a predetermined range of the set point weight or amount.

In another embodiment, the invention is a computer implemented data processing method to feed a material compounding system, comprising: referring to a look-up data base to determine a set point weight or amount for a material to be charged to the compounding system; sensing an initial combined weight of a material extracting apparatus and a container with material; signaling commencement of a material extracting apparatus operation to evacuate the material from the container; sensing a progressing combined weight of the material extracting apparatus and the container with material; calculating a charged material weight according to a difference between the initial combined weight and the sensed progressing combined weight; and terminating the material extracting apparatus operation when a calculated charged material weight is within a specified range of the set point weight or amount.

And in still another embodiment, the invention is a controller for a feed to a compounding system, comprising: a set of instructions to read a material feed session set point weight or amount; to direct feeding a viscous material in the session by cutting a steadily moving material into a portion that feeds sequentially to the compounding system; to monitor a session total of material fed to the compounding system; to compare the session total of material to the session set point weight or amount; to increase a cutting rate of the moving material to decrease each cut increment of material as the session set point weight or amount is approached; and to terminate the material feed of the session when the total material is substantially equal to the session set point weight or amount.

And in another embodiment, the invention is a silicone gum processing system, comprising: a silicone gum compounding system; and a viscous material feed system to the compounding system, the feed system comprising a cutting apparatus that cuts material according to weight of material charged to the compounding system as monitored by a controller having a set of instructions to decrease a weight or size of cut material increments fed to the compounding system as a feed session set point weight or amount is approached and to terminate the feed to the compounding system when the session set point weight or amount is attained.

DETAILED DESCRIPTION OF THE INVENTION

The invention relates to the handling of a viscous material such as a silicone gum. "Silicone gum" includes a viscous silicone or polysiloxane or organopolysiloxane that has the chemical formula $[R_2SiO]_n$, where R=organic groups such as methyl, ethyl, and phenyl. These materials typically comprise an inorganic silicon-oxygen backbone (... —Si—O—Si—O—Si—O— ...) with attached organic side groups, which can be four-coordinate. In some cases, organic side groups can be used to link two or more of these —Si—O— backbones together.

By varying the —Si—O— chain lengths, side groups, and crosslinking, silicones can be synthesized with a wide variety of properties and compositions. They can vary in consistency from liquid to gel to rubber to hard plastic. Silicone rubber or silicone gum is a silicone elastomer, typically having high temperature properties. Silicone rubber offers resistance to extreme temperatures, being able to operate normally from minus 100° C. to plus 500° C. In such conditions tensile strength, elongation, tear strength and compression set can be superior to conventional rubbers.

A silicone gum can be extruded or molded into custom shapes and designs such as tubes, strips, solid cord or custom profiles within size restrictions specified by a manufacturer. Cord can be joined to make "O" Rings and extruded profiles can also be joined to make up seals.

It is desirable to provide a viscous feed system that accurately and efficiently processes viscous materials such as silicone gum for use in various applications. However, these materials can be highly resistant to flow, highly adhering, highly cohering, and/or shear thickening and consequently difficult to handle. Accuracy of a packaging process and/or accuracy of a process of obtaining a defined quantity of such material, for example in a continuous process, is costly when substantial time is required for cutting or separating a quantity of the material from a larger quantity. Also, it is costly and disadvantageous when an incorrect amount of material is used in a downstream process.

The invention provides a system and method to control processing of viscous material. Features of the invention will become apparent from the drawings and following detailed discussion, which by way of example without limitation describe preferred embodiments of the invention. In this application, a reference to "back" means left on a drawing or drawings and a reference to "forward" means right on the drawing or drawings.

Figure 1:
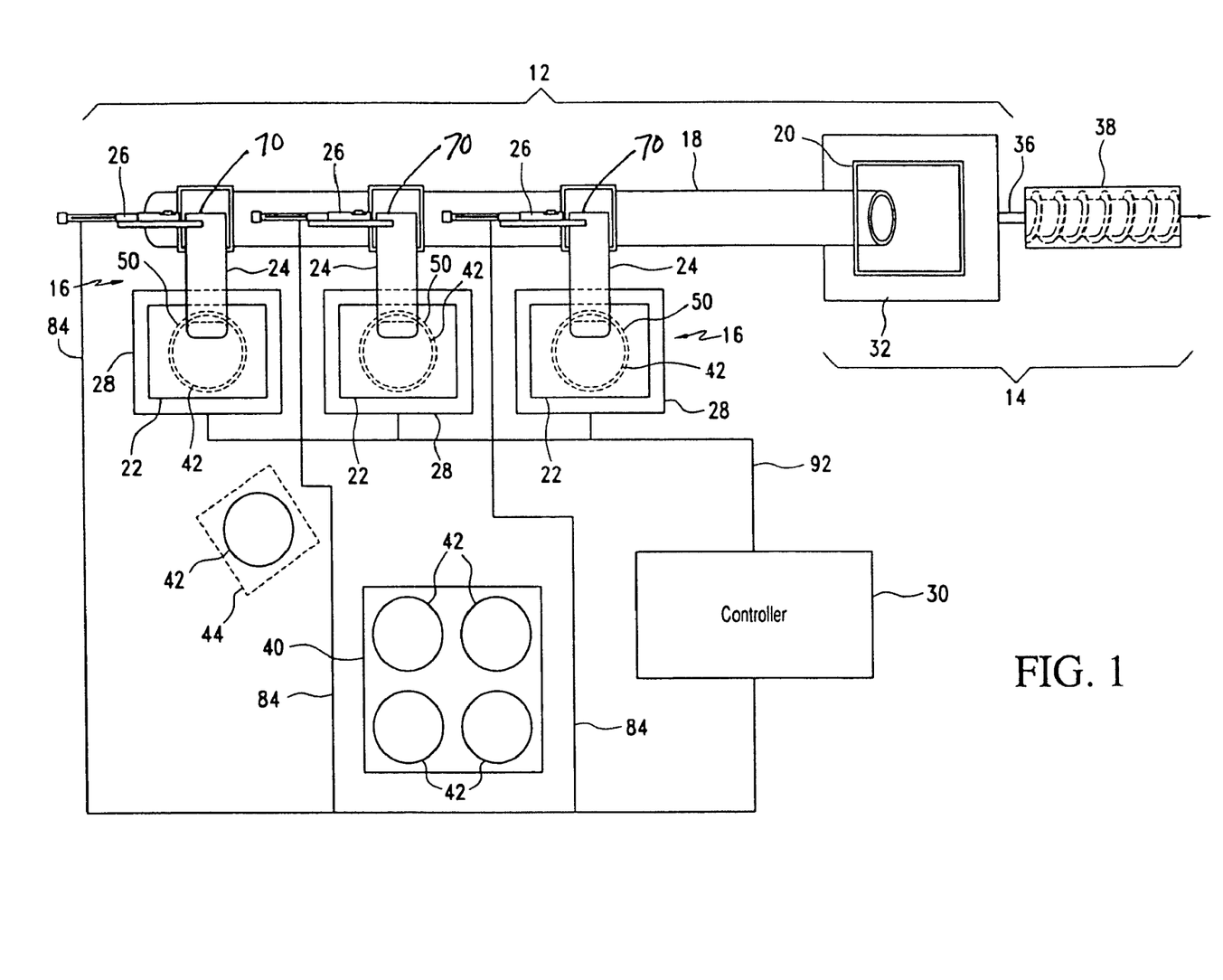
FIG. 1, FIG. 2 and FIG. 3 are schematic representations of a material processing system.
Figures 2, 6:
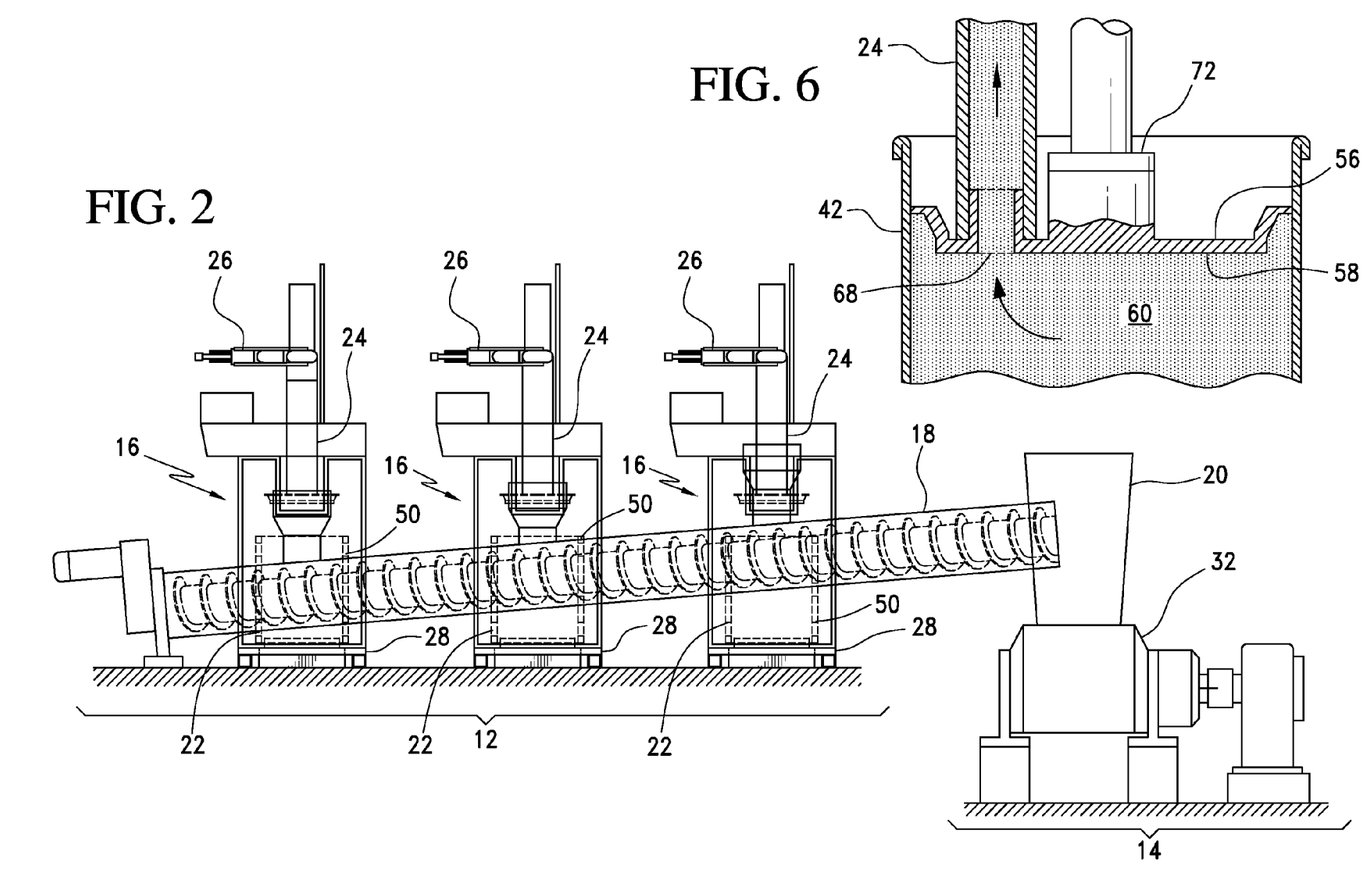
FIG. 6 is a cut away view of a section of a drum press.
Figure 3:
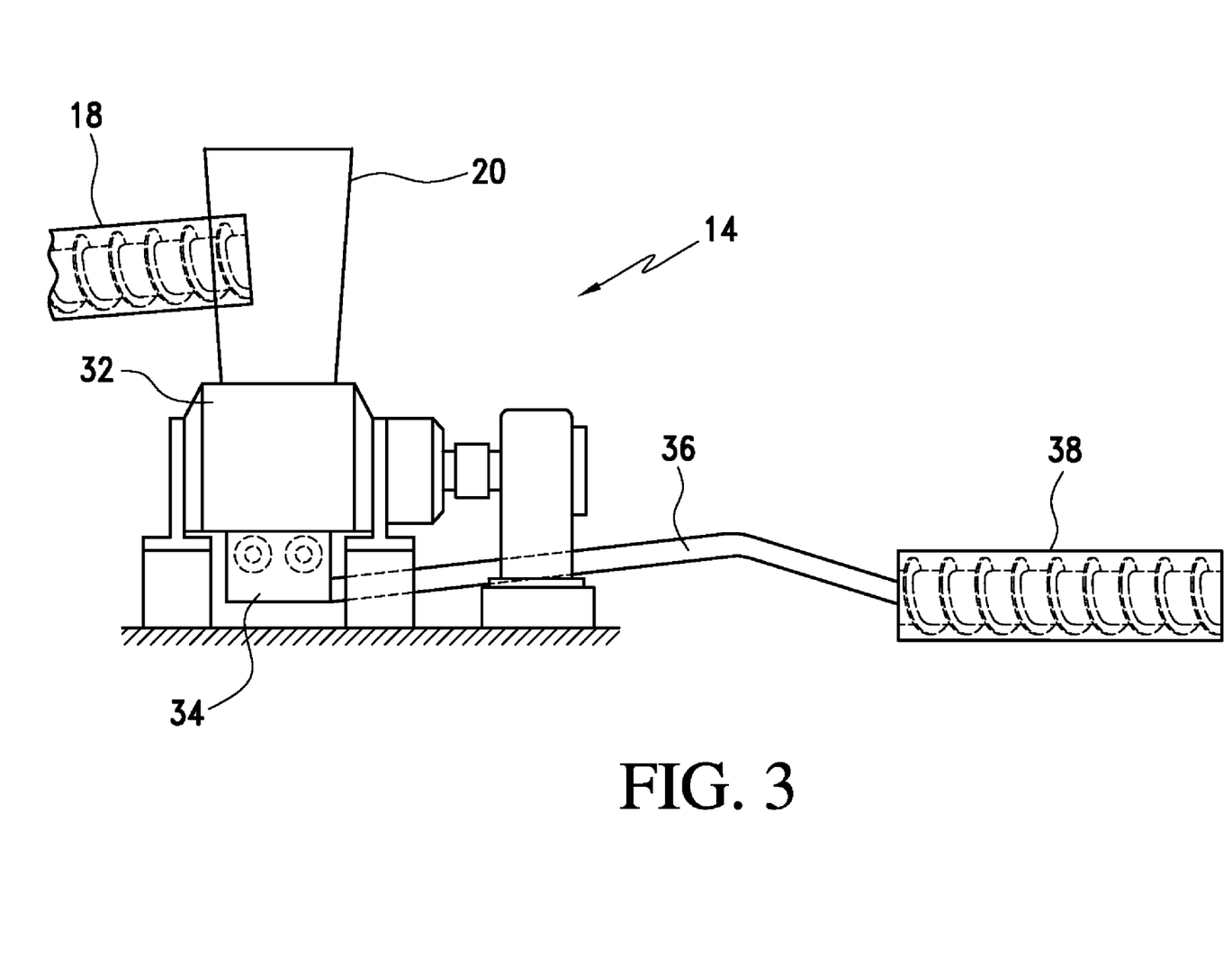
Figure 4:
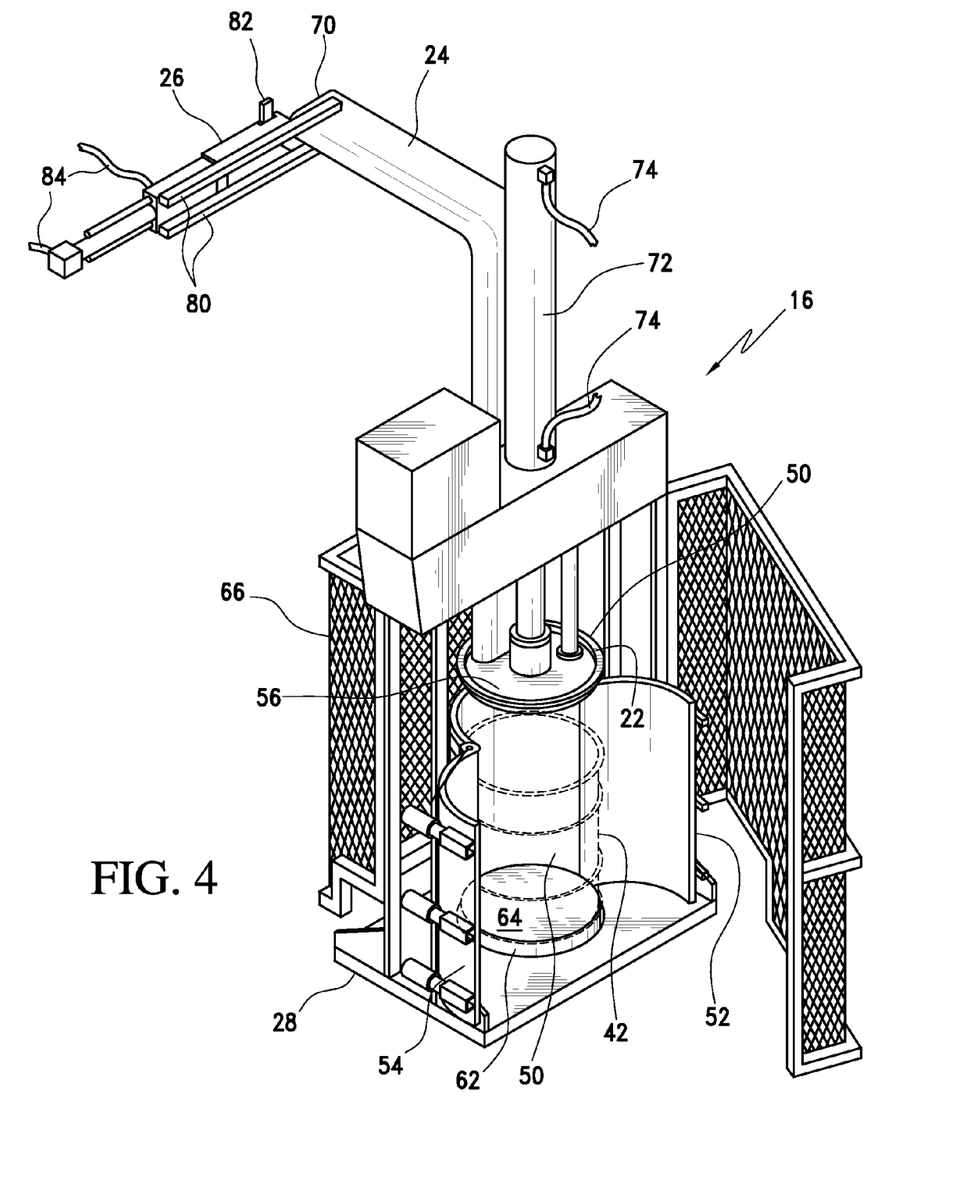
FIG. 4 and FIG. 5 are perspective views of a drum press.
Figure 5:
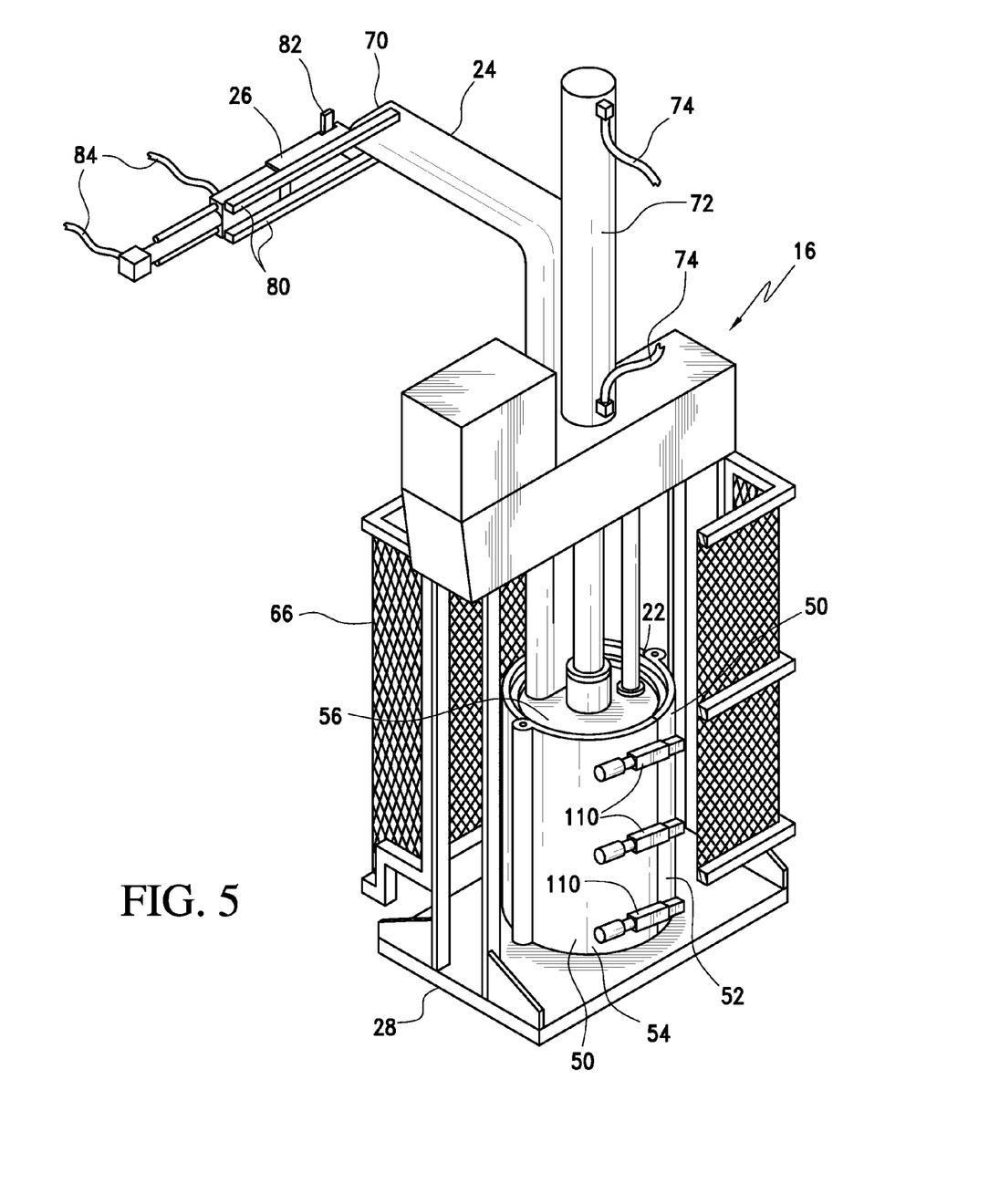

A preferred embodiment shown in the drawings, illustrates the invention as a process to compound silicone gum into a base for forming articles. In the drawings, FIG. 1 is a schematic top view representation and FIG. 2 is a schematic side view representation of a section of a material processing system showing an integrated feed system 12 and compounding system 14. The feed system 12 includes a battery of material extracting apparatus (MEA) 16, conveyor 18 and chute 20. FIG. 4 and FIG. 5 are elevation views of an MEA 16 and FIG. 6 is a cut away side sectional view of a section of the MEA 16. The MEA 16 includes container evacuator 22, feed tube 24, cutting apparatus 26 and floor scale 28. The integrated feed system 12 is controllably connected to controller 30. FIG. 6 is a cut away view of an upper section of the drum press, MEA 16 of FIG. 4 and FIG. 5. As shown in FIG. 1, FIG. 2 and FIG. 3, compounding system 14 includes mixer 32, roll mill 34, conveyor belt 36 and compounder 38.

The MEA 16 serves to express the viscous material from a container to the compounding system 14. In typical operations, 55-gallon steel drums 42 from a pallet 40 are dumped into totes and the totes (approx. 80 pounds each) are dumped into a Banbury mixer. In a preferred compounding operation of the invention with respect to FIG. 1, FIG. 2 and FIG. 3, operation commences with delivery of a pallet 40 of four drums 42 of gum. While the drum 42 can be any material holding enclosure, the drawings embodiment is a feed system including a method of evacuating a silicone gum-containing drum 42. A suitable drum 42 in the embodiment, has full openable ends and has a cylindrical wall of steel, fiberboard or other material structure for transporting a silicone gum material. The drum 42 has opposite ends, each of which is openable to accommodate a movable plunger at one end as hereinafter described.

The material in the drums 42 may be identical or it may be of a variety of physical properties such as viscosity. The drums 42 are removed from the pallet 40 one by one by drum hauler 44 such as from Easy Lift Equipment Co., Inc., 2 Mill Park Court, Newark, Del. 19713. The lid of each of three drums 42 is removed and each of the drums 42 is loaded by the hauler 44 into a respective container evacuator 22, which may be a Schwerdtel S 6-F drum press. Use of the drum hauler 44 eliminates ergonomic risks associated with lifting and handling the heavy drums 42. The silicone gum is then forced from each drum by an MEA 16 into the conveyor 18. In the drawings embodiment, an MEA 16 comprises a container evacuator 22, feed tube 24 and cutting apparatus 26. The container evacuator 22 can be a drum press, which is a device that evacuates viscous or compacted contents from a drum.

As illustrated in FIG. 2, FIG. 4 and FIG. 5, the container evacuator 22 is a press that comprises a substantially cylindrical chamber 50 with hinged enclosures 52 and 54 for securing a drum 42 removably within the chamber 50. The chamber 50 and hinged enclosures 52 and 54 securely cradle the drum 42 during a material extracting operation. A disc-shaped platen 56 fits into the chamber 50 with a flat driving surface 58 (FIG. 6) oriented perpendiculars to the longitudinal axis of the chamber 50 and correspondingly perpendicular to the longitudinal axis of a drum 42 held within the chamber 50.

The operation of feed system 12 can be described with reference to FIG. 1, FIG. 2, FIG. 4, FIG. 5 and FIG. 6. In operation, the press enclosures 52 and 54 are unlatched by activating fasteners 110 to open enclosures 52 and 54. The drum hauler 44 is used to load a first drum 42 into the press cavity 60. The drum 42 is positioned by a locator ring 62 at the base 64 of the chamber 50. The press enclosures 52 and 54 resist axial expansion pressure exerted by plunger 72 driving through drum 42. The enclosures 52 and 54 are secured by a plurality of fasteners 110.

Each MEA 16 includes the container evacuator 22, feed tube 24 and cutting apparatus 26 and cage 66 and each is set on a respective floor scale 28. In each MEA 16, the feed tube 24 is connected through the disc shaped platen 56 (FIG. 6) to communicate with the press cavity 60. The platen 56 is driven by hydraulic plunger 72.

An operator can commence system operation at controller 30. When a cycle is activated by the operator, a plunger 72 of each container evacuator 22 of the battery shown in FIG. 1, is activated via control lines 84. FIG. 4 shows connecting sections 74 of control lines 84 to MEA 16. Then, as the screw conveyor 18 starts turning, the press platen 56 with connected feed tube 24 is forced by hydraulically driven plunger 72 to travel down into the drum 42 interior. As further illustrated in FIG. 6, as platen 56 traverses the drum 42 longitudinal axis within the press cavity 60, drum contents are displaced upward into a connecting orifice 68 of the feed tube 24. As the platen 56 completes traversing the drum axis, all material is forced upward into the feed tube 24 to be eventually expelled from the feed tube discharge port 70.

The material is cut into increments by cutting apparatus 26 as it exits from the discharge port 70 to the conveyor 18 to charge to compounding system 14. Cutting can be accomplished by various cutting mechanisms, including a cutting head disposed at an outlet end, port 70 of the feed tube 24. In the FIG. 4, FIG. 5 and FIG. 6 embodiment, the MEA 16 includes a cutting apparatus 26 located at discharge port 70. The cutting apparatus 26 includes rails 80 that secure cutting wire 82 to guide the wire 82 to cut material exiting the feed tube discharge port 70. The rails 80 secure the cutting wire 82 to traverse the feed tube 24 longitudinal axis at discharge port 70 when activated by controller 30 via lines 84 (FIG. 1).

The controller 30 of FIG. 1 illustrates an embodiment of the invention. Controller 30 is responsively connected to loss of weight scales 28 via lines 92 to sense loss of weight as material is expressed from the drums 42 to conveyor 18. The controller 30 computes a weight of material charged to the conveyor 18 by the difference between an initial weight of the MEA 16 and initially emplaced and full drum 42. In the embodiment of the drawings, the controller 30 can sense an initial total weight of all the MEAs 16 and emplaced full drums 42 of the MEA battery of for example, the three shown in FIG. 1. The controller 30 monitors the combined weight as material in the drums is evacuated to the conveyor 18. The controller 30 contemporaneously calculates a weight of material charged to the conveyor 18 and hence to the compounding system according to a difference between the initial total weight and contemporaneously sensed total weight.

The controller 30 also can control operation of cutting apparatus 26 according to the calculated charged material weight. Initially, the cutting apparatus 26 can be programmed to make cuts of about "football" sized material, for example to fit into a 14" inner diameter screw conveyor 18. Once a piece of material is cut from the feed tube discharge port 70, floor scale 28 senses a contemporaneous weight and feeds this signal back to the controller 30. The controller 30 controls the material processing system 10 according to "set points." In this application, a "set point weight or amount" is a target quantity or amount of material to be fed from a feed system, usually in a feed session. In one embodiment, "set point weight or amount" means a point weight or amount at which the feed session is to be terminated. In another embodiment, as the controller 30 senses a contemporaneous weight signal and calculates that a total charged weight is within a specified range of total material to be charged (for example within 15 pounds of "set point weight or amount") to the compounding system 14, the controller can signal the cutting apparatus 26 via lines 84 to increase cut frequently to produce smaller incremental pieces. The smaller pieces at approach to set point weight or amount permit improved control of feed to attain a charged material weight within a prescribed tolerance range, for example ±2 pounds for a batch.

As the drum 42 evacuation process is completed, door fasteners 110 of the hinged enclosures 52 and 54 open and a controller 30 Run Screen can display "NEW DRUM." A beacon light mounted on the container evacuator 22 can turn yellow, indicating another drum 42 is ready to be changed. The hydraulic platen driving motor terminates and the chamber 50 enclosures open. The evacuator 22 is reloaded with a drum and the process repeated. As material is charged from the MEAs 16 to the screw conveyor 18, the conveyor is turning at low rpms to feed the material to the mixer. The screw is programmed to stop turning 90 seconds after the last MEA 16 makes its last cut. This time can be adequate to clear all material from the conveyor 18.

As material is charged from the MEAs 16 to the screw conveyor 18, the conveyor is turning at low rpms to feed the material to the mixer. The conveyor screw is programmed to stop turning 90 seconds after the last MEA 16 makes its last cut. This time can be adequate to clear all material from the conveyor 18.

Conveyor 18 transports and drops the cut viscous material to chute 20 to compounding system 14, which includes mixer 32 such as a Banbury, roll mill 34, conveyor belt 36 and compounder 38. In the mixer 32, fumed silica, the silicone gum and a treating agent can be added to form a densified polymer/filler mass. After the gum feed is mixed, it is dropped into the nip of roll mill 34 where the material is rolled into a strip form. After a drop, a programmed logic controller (PLC), for example controller 30, verifies that the mixer drop door has opened, then reclosed and is ready for feed. For any residual material that hangs in the chute, a "pusher" is programmed to sweep a few seconds after the conveyor 18 stops. This serves to scrape down the chute 20, and ensure all material gets into the mixer 32 to correctly formulate the batch.

The mill imparts a final mix to fully incorporate filler and to cool material. Then, the material is stripped from the mill in a strip form. The strip form is fed by means of conveyor belt 36 into compounder 38, which may be an extruder. The compounder 38 serves to clean and form the material for packaging. The material can be packaged and boxed through an automated cut, weigh and packaging system.

Figure 7:
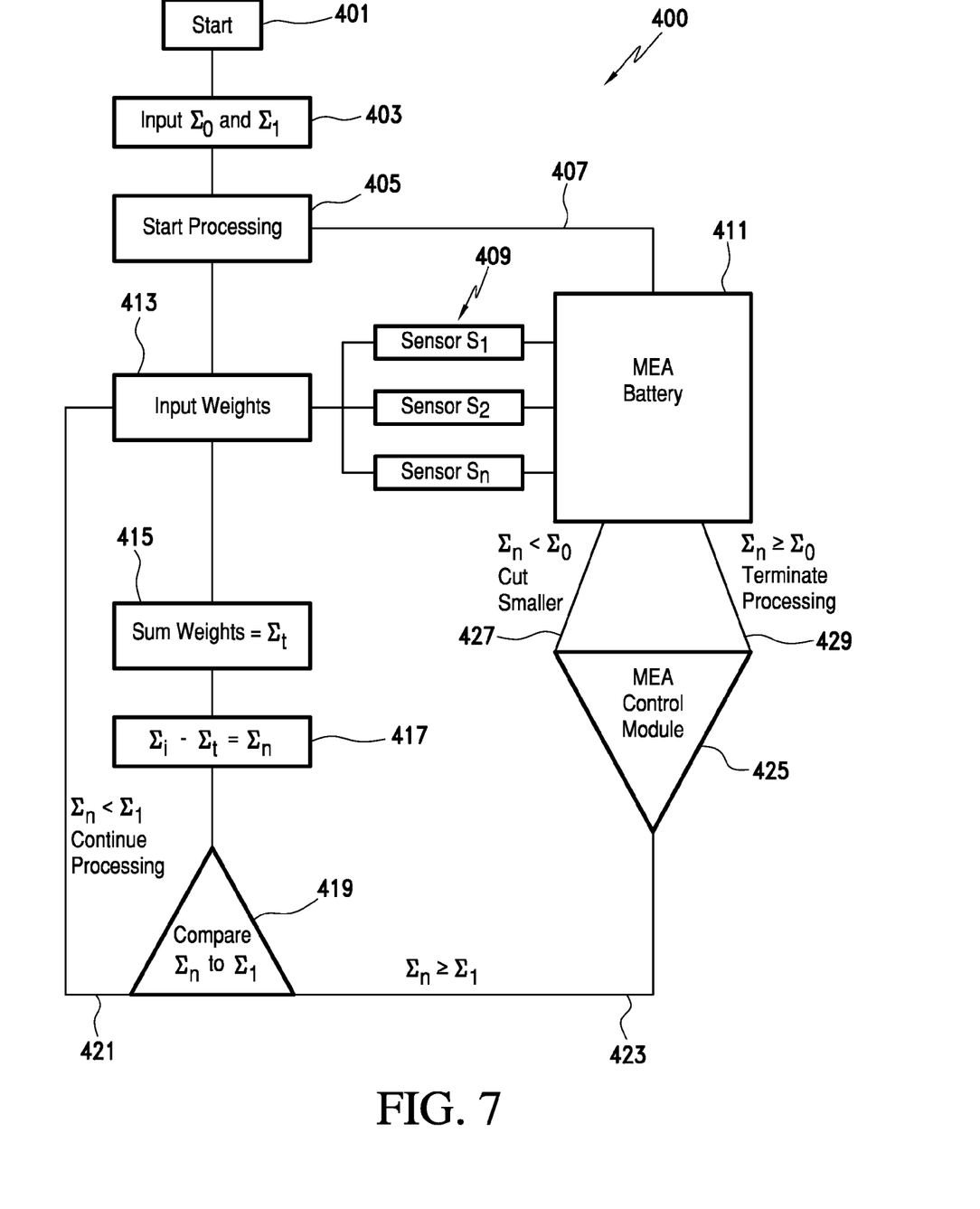
FIG. 7 is a flow diagram of a control process.

The controller 30 of FIG. 1 can be a microprocessor, computer, data processing device, semiconductor chip or the like. FIG. 7 is a flow diagram of a preferred embodiment control system 400 of the invention. The FIG. 7 signal processing can be incorporated by controller 30 to control a material processing system as follows.

At a session start 401, input values, $\Sigma_1$ and $\Sigma_0$ that are set point weights or amounts are input 403 into the control system 400. Input value $\Sigma_1$ represents a first target value of material that triggers a change in a charging rate of material to the compounding system 14. Input value $\Sigma_0$ represents a target total material to be charged in a session to a compounding system, for example to the compounding system 14 via conveyor 18 of FIG. 1. A session is a period defined by a time or quantity of material to be charged to the processing system 400. The time or quantity may be determined by an amount of a contract, package size, shipment size or the like of material to be charged for further processing or use and the input values $\Sigma_1$ and $\Sigma_0$ can be identified by a "look up" table resident within a controller 30 or entered by an operator according to desired target values. According to an aspect of the present invention, charging smaller increments from a continuous viscous feed material toward the end of a session (at $\Sigma_1$), permits charging of a precise total material for the session. With smaller increments, a session can be terminated within a small plus or minus material of the session target total quantity or amount ($\Sigma_0$).

Controller 30 has a set of instructions to store the input 403 values $\Sigma_1$ and $\Sigma_0$ representing the material set points for material to be charged from the MEA battery 411. A start signal 405 activates 407 the MEA battery 411 comprising for example, 2, 3 or n number of material extracting apparatus 16. Each of a battery 409 of sensors $S_1, S_2 \ldots S_n$, senses a respective weight of each MEA of the battery 411, including evacuator 22, container 42 and contents. First, an initial weight is sensed of the evacuator 22 and a full container 42 prior to expressing any content. This initial value is input 413 to controller 30 and summed $\Sigma_i$ and stored for all MEAs 16 of the battery 411. Then as the viscous material process proceeds, each evacuator plunger 72 of each MEA 16 of battery 411 drives axially into each container 42 to express material from the container 42. As material is expressed and cut to conveyor 18, each sensor $S_1, S_2 \ldots S_n$ senses a progressing combined weight of each material extracting apparatus 16, container 42 and dwindling contained material and the combined weights are summed 415 to a sum weight $\Sigma_t$. The sum weight $\Sigma_t$ is subtracted 417 from $\Sigma_i$ to provide a progressing amount of material $\Sigma_n$ that represents material charged to the compounding system 14 by time or period n.

Then, progressing amount $\Sigma_n$ is compared 419 with input values for target total material $\Sigma_0$ and amount of material $\Sigma_1$ that represents a first value that triggers the charging rate change. If the comparison 419 indicates that $\Sigma_n < \Sigma_1$, then control of system 400 operation is cycled 421 and continued with continuing operation of the MEA 411 and input of values from the sensors $S_1, S_2 \ldots S_n$. If the comparison 419 indicates that $\Sigma_n \geq \Sigma_1$, then control of the system is switched to control cycle 423 and MEA control module 425. Control module 425 effects a next comparison of $\Sigma_n$, this time with the target total material $\Sigma_0$ value. If $\Sigma_n < \Sigma_0$, then processing continues 427 but the size of the cut increments is decreased; if $\Sigma_n \geq \Sigma_0$, then the process 400 is terminated 429.

The following Example is illustrative and should not be construed as a limitation on the scope of the claims.

EXAMPLE

This EXAMPLE is a combined description of press (MEA) experiments at Schwerdtel US headquarters (New Jersey), ProSys Corporation (Missouri), and at GE Silicones Waterford, N.Y. Experiments on a shaftless screw conveyor were conducted at GE Silicones Waterford using Martin Sprocket equipment.

A viscous material feed system as schematically illustrated in the drawings included a Schwerdtel S 6-F drum press mounted to Vishay BLH floor scale that measured material flow according to loss of weight. The Schwerdtel S 6-F press included a hydraulic pressure driven cylinder and platen that drives a platen into a 55 gallon drum.

The feed system included a feed tube to receive material expressed from a drum by the press and a pneumatic solenoid operated cutting system that metered material from the feed tube to a 12"×24' shaftless screw conveyor according to loss of weight sensed by the scale. The screw conveyor interfaced to a chute. The chute permitted material to fall via gravity directly to a Banbury mixer. Material remaining in the chute was cleared by a pneumatic pusher prior to each mix (GE design and fabrication). The system was controlled by operators at two (2) QuickPanel LM90 touch screens of a control system.

In operation, an operator first entered set point weight or amounts into a system controller. In this embodiment, one set point weight or amount represented a target batch of silicone gum to be charged to a Banbury mixer, which was part of a silicone gum compounding system. A pallet of four (4) fifty-five (55) gallon drums of silicone polymer (Viscosity Range 150,000 to 900,000 Poise) was placed on a drum carousel. The 55-gallon straight-sided steel drums were delivered by the carousel and one drum was loaded into the Schwerdtel S 6-F drum press using an Easy Lift Equipment Drum Hauler unit. The Schwerdtel S 6-F drum press was controlled by a GE Fanuc 90/30 PLC. Material was displaced, from the drum to the feed tube by the hydraulic Schwerdtel gum press.

The operator pressed a START OR RESTRT BATCH button of the controller to commence operation. The press doors were secured by hydraulically driven fasteners. Then, as the screw conveyor started turning, the hydraulically driven press platen commenced traveling down into the drum. As a platen traversed the drum, drum contents were squeezed upward into the feed tube. As the platen completed traversing the drum axis, all material was forced upward into the feed tube. As material exited the feed tube, a pneumatic solenoid operated cutting system diced the material into pieces that then felt into a 12"×24' shaftless screw conveyor to charge to a Banbury mixer.

A batch of material flow from conveyor to the Banbury mixer was measured by loss of weight detected by the Vishay BLH load cells. A combined weight of presses, feed tubes, cutting mechanisms and material-containing drums was registered by the control system as a first weight. The control system monitored a charged weight of silicone gum to the Banbury by registering progressing weight as silicone gum was pressed from the drums and expelled through the feed tubes and cutting systems. The control system displayed a differential between the first weight and registered progressive weights that represented a charged silicone gum weight. The cutting mechanism rate was increased when charged silicone gum weight was within 15 pounds of the set point weight. The control system continued to sense the differential weight and terminated the batch operation when the differential weight registered within a ±2 pound range of the set point weight or amount.

The EXAMPLE illustrates control of material charge to a compounding system according to the invention.

The invention includes changes and alterations that fall within the purview of the following claims. The foregoing examples are merely illustrative of the invention, serving to illustrate only some of the features of the present invention. For example, the invention includes a controller with a set of instructions: to refer to a look-up data base to determine a set point weight or amount for a material to be charged to a compounding system; sensing an initial combined weight of a material extracting apparatus and a container with material; signaling commencement of the material extracting apparatus operation to evacuate the material from the container; sensing a progressing combined weight of the material extracting apparatus and the container with material; calculating a charged material weight according to a difference between the initial combined weight and the sensed progressing combined weight; and terminating the material extracting apparatus operation when a calculated charged material weight is within a specified range of the set point weight or amount.

The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention.

As used in the claims, the word "comprises" and its grammatical variants logically also subtend and include phrases of varying and differing extent such as for example, but not limited thereto, "consisting essentially of" and "consisting of."

Where necessary, ranges have been supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims.

It is also anticipated that advances in science and technology will make equivalents and substitutions possible that are not now contemplated by reason of the imprecision of language and these variations should also be construed where possible to be covered by the appended claims.

All United States patents (and patent applications) referenced herein are herewith and hereby specifically incorporated by reference in their entirely as though set forth in full.

The invention includes changes and alterations that fall within the purview of the following claims.

What is claimed is:

1. A computer implemented method to feed a viscous material, comprising: storing an input set point weight or amount, cutting a viscous material in a feed system into increments for feed of a progressing weight or amount of the viscous material to a processing system, sensing the progressing weight or amount of the viscous material fed by the feed system; comparing the progressing weight with the set point weight or amount; and terminating feed from the feed system when the compared progressing weight is substantially equal to the stored set point weight or amount.

2. The computer implemented method of claim 1, comprising storing a first set point weight or amount representing a weight or amount of material to be fed by the feed system and second set point weight or amount representing a weight or amount of material to be fed by the feed system.

3. The computer implemented method of claim 1, comprising storing a first set point weight or amount representing a weight or amount of material to be fed by the feed system and second set point weight or amount representing a weight or amount of material to be fed by the feed system and comparing the progressing weight or amount of material with the first set point weight or amount and with the second set point weight or amount.

4. The computer implemented method of claim 1, comprising storing a first set point weight or amount representing a weight or amount of material to be fed by the feed system and second set point weight or amount representing a weight or amount of material to be fed by the feed system; feeding increments of weight or amount of a continuous viscous body of material; comparing the progressing weight or amount of material with the first set point weight or amount and with the second set point weight or amount; and altering the weight or amount of the increments when the progressing weight or amount of material is substantially the same as the first set point weight or amount.

5. The computer implemented method of claim 1, comprising storing a first set point weight or amount representing a weight or amount of material to be fed by the feed system and second set point weight or amount representing a weight or amount of material to be fed by the feed system; feeding increments of weight or amount of a continuous viscous body of material; comparing the progressing weight or amount of material with the first set point weight or amount and with the second set point weight or amount; and altering the weight or amount of the increments when the progressing weight or amount of material is substantially the same as the first set point weight or amount by increasing a cut rate of increments from a viscous body of the feed material.

6. The computer implemented method of claim 1, comprising storing a first set point weight or amount representing a weight or amount of material to be fed by the feed system and second set point weight or amount representing a weight or amount of material to be fed by the feed system; feeding increments of weight or amount of a continuous viscous body of material; comparing the progressing weight or amount of material with the first set point weight or amount and with the second set point weight or amount; altering the weight or amount of the increments when the progressing weight or amount of material is substantially the same as the first set point weight or amount; comparing the progressing weight or amount of material with the second set point weight or amount and terminating feed from the system when the compared progressing weight is substantially equal to the second set point weight or amount.

7. The computer implemented method of claim 1, comprising storing a first set point weight or amount representing a weight or amount of material to be fed by the feed system and second set point weight or amount representing a weight or amount of material to be fed by the feed system; feeding increments of weight or amount of a continuous viscous body of material; comparing the progressing weight or amount of material with the first set point weight or amount and with the second set point weight or amount; altering the weight or amount of the increments when the progressing weight or amount of material is substantially the same as the first set point weight or amount; terminating feed from the system when the compared progressing weight is substantially equal to the second set point weight or amount.

8. The computer implemented method of claim 1, comprising feeding increments of weight or amount of a continuous viscous body of material to a compounding system; storing an input set point weight or amount, sensing the progressing weight or amount of the increments of material fed by the feed system; comparing the progressing weight with the set point weight or amount; and terminating feed from the system when the compared progressing weight is substantially equal to the set point weight or amount.

9. The computer implemented method of claim 1, comprising feeding increments of weight or amount of a continuous viscous body of material from a battery of material extracting apparatus to a compounding system; storing an input set point weight or amount, sensing the progressing weight or amount of the increments of material fed by the battery; comparing the progressing weight with the set point weight or amount; and terminating feed from the battery when the compared progressing weight is substantially equal to the set point weight or amount.

10. The computer implemented method of claim 1, comprising feeding increments of weight or amount of a continuous viscous body of material from a battery of material extracting apparatus to a compounding system; storing an input storing a first set point weight or amount and second set point weight or amount, sensing the progressing weight or amount of the increments of material fed by the battery; comparing the progressing weight with the second set point weight or amount; and terminating feed from the battery when the compared progressing weight is substantially equal to the second set point weight or amount.

11. The computer implemented method of claim 1, comprising feeding increments of weight or amount of a continuous viscous body of material from a battery of material extracting apparatus to a compounding system; storing a first set point weight or amount and second set point weight or amount; comparing the progressing weight or amount of material with the first set point weight or amount; and altering the weight or amount of the increments when the progressing weight or amount of material is substantially the same as the first set point weight or amount.

12. The computer implemented method of claim 1, comprising: feeding increments of a continuous viscous body of material from a battery of material extracting apparatus to a compounding system; storing an input first set point weight or amount and second set point weight or amount; sensing the progressing weight or amount of the of material fed by the battery; comparing the progressing weight or amount of material with the first set point weight or amount; and altering the increments when the progressing weight or amount of material is substantially the same as the first set point weight or amount; comparing the progressing weight or amount with the second set point weight or amount; and terminating feed from the battery when the compared progressing weight or amount is substantially equal to the second set point weight or amount.

13. The computer implemented method of claim 1, comprising: feeding increments of a continuous viscous body of material from a battery of material extracting apparatus to a compounding system; storing an input first set point weight or amount and second set point weight or amount; sensing the progressing weight or amount of the of material fed by the battery; comparing the progressing weight or amount of material with the first set point weight or amount; and altering the weight or amount of the increments when the progressing weight or amount of material is substantially the same as the first set point weight or amount by increasing a cut rate of increments from the feed material from the battery.

14. The computer implemented method of claim 1, comprising: feeding increments of a continuous viscous body of material from a battery of material extracting apparatus to a compounding system; storing an input first set point weight or amount and second set point weight or amount; sensing the progressing weight or amount of the of material fed by the battery; comparing the progressing weight or amount of material with the first set point weight or amount; and terminating feed from the system when the compared progressing weight is substantially equal to the second set point weight or amount.

15. The computer implemented method of claim 1, comprising: feeding increments of a continuous viscous body of material from a battery of material extracting apparatus to a compounding system; storing an input first set point weight or amount and second set point weight or amount; sensing the progressing weight or amount of the of material fed by the battery; comparing the progressing weight or amount of material with the first set point weight or amount; and altering the weight or amount of the increments when the progressing weight or amount of material is substantially the same as the first set point weight or amount; and terminating feed from the system when the compared progressing weight is substantially equal to the second set point weight or amount.

16. The computer implemented method of claim 1, comprising: (i) storing an input value representing a material set point weight or amount, (ii) sensing an initial combined weight of a material extracting apparatus and a container with material, the container held by the extracting apparatus; (iii) activating an evacuator plunger axially to the container and slidably to express material from the container; (iv) sensing the progressing combined weight of the material extracting apparatus and the container with material as material is expressed from the container; (v) calculating a material weight charged from the feed system to a subsequent process according to a difference between the initial combined weight and the progressing weight; (vi) comparing the calculated difference with a stored set point weight or amount representing an amount of material to be charged from the feed system; and (vii) terminating the activation of the plunger when the calculated difference is substantially the same as the set point weight or amount.

17. A computer implemented data processing method for a viscous silicone gum material, comprising:

registering a viscous silicone gum material feed session set point weight or amount range defined by a first set point weight or amount of the silicone gum and a second set point weight or amount of the silicone gum;

driving a material feed system to feed silicone gum material in the session by cutting a steadily moving silicone gum material into increments that feed sequentially to a compounding system;

monitoring a session total of silicone gum fed to the compounding system;

comparing the session total of silicone gum to the session set point weight or amount range;

increasing a cutting rate of silicone gum increments to decrease each cut increment quantity when total material is substantially equal to the first set point weight or amount of the session set point weight or amount range; and terminating the silicone gum feed of the session when the total silicone gum is substantially equal to a second limit of the set point weight or amount range.

* * * * *